United States Patent [19]

Takeuchi

[11] Patent Number: 5,323,986
[45] Date of Patent: Jun. 28, 1994

[54] OPERATING MEMBER FOR A COVER TYPE FISHING REEL

[75] Inventor: Shinji Takeuchi, Tokyo, Japan

[73] Assignee: Daiwa Seiko, Inc., Tokyo, Japan

[21] Appl. No.: 864,950

[22] Filed: Apr. 7, 1992

[30] Foreign Application Priority Data

Apr. 11, 1991 [JP] Japan .............................. 3-032375[U]

[51] Int. Cl.⁵ .............................................. A01K 89/01
[52] U.S. Cl. .............................................. 242/240
[58] Field of Search ............... 242/238, 239, 240, 260, 242/261

[56] References Cited

U.S. PATENT DOCUMENTS

| | | | |
|---|---|---|---|
| 3,018,979 | 1/1962 | Clickner | 242/240 |
| 3,175,781 | 3/1965 | Maury et al. | 242/240 X |
| 3,223,347 | 12/1965 | Clark | 242/240 |
| 3,858,822 | 1/1975 | Wood | 242/239 |
| 4,415,129 | 11/1983 | Neufeld | 242/239 |
| 4,570,878 | 2/1986 | Nakajima | 242/261 |
| 4,749,285 | 6/1988 | Noda | 242/240 X |
| 4,819,893 | 4/1989 | Ueno | 242/261 |

FOREIGN PATENT DOCUMENTS 57-44856 10/1982 Japan .
64-6054 2/1989 Japan .

*Primary Examiner*—Daniel P. Stodola
*Assistant Examiner*—Michael R. Mansen
*Attorney, Agent, or Firm*—Longacre & White

[57] ABSTRACT

An operating member (15) for regulating the grip on a fishing line (20) in a cover type fishing reel uses translational motion which is transformed to generally transverse translational movement by a facing mechanism (16, 17) Consequently, a reasonable and natural thumb motion is used to regulate the grip on the fishing line (20) and at the same time, a fisherman is able to maintain a comfortable and proper hold on a fishing rod (30) upon which the cover type fishing reel is mounted.

7 Claims, 2 Drawing Sheets

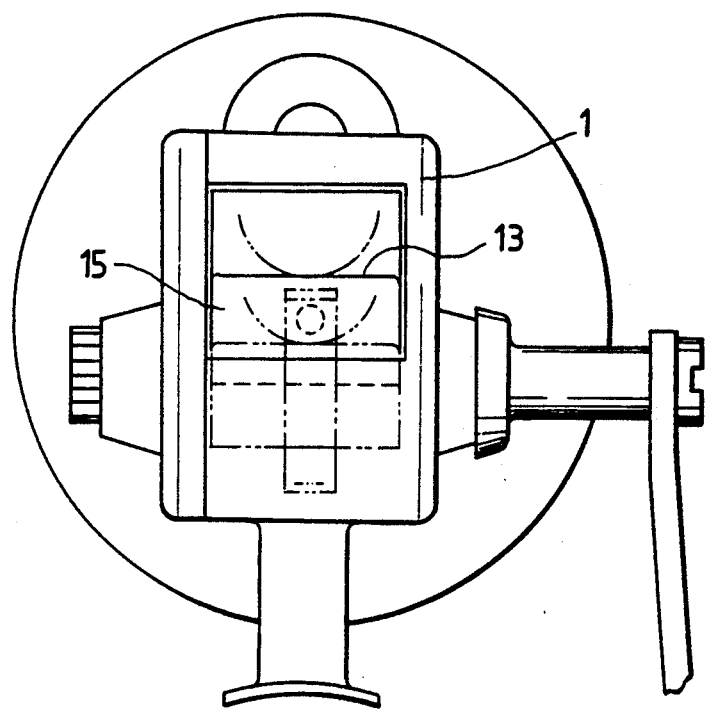
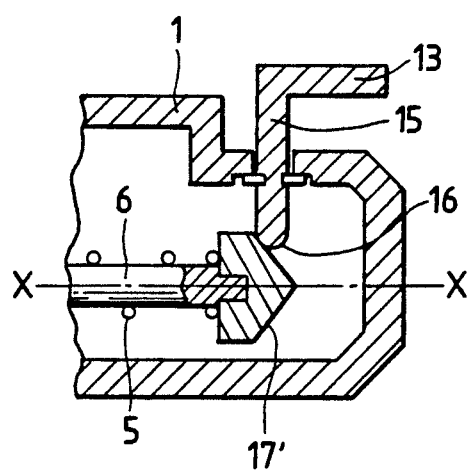
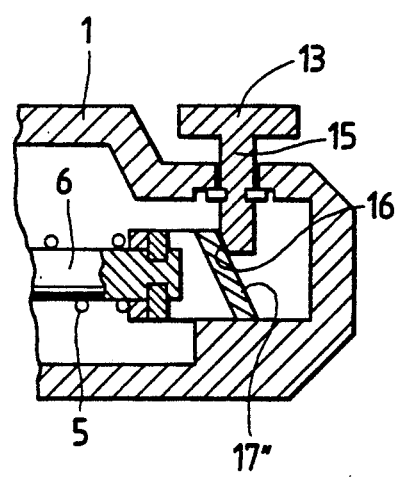

OPERATING MEMBER FOR A COVER TYPE FISHING REEL

BACKGROUND OF THE INVENTION

1. Field of the Invention

The present invention relates to an improvement of a cover type fishing reel.

2. Description of Related Art

Japanese examined utility model publication No. 57-44856 and Japanese examined patent publication No. 64-6054 disclose a conventional cover type fishing reel. They show that it is known to use a thumb actuated operating member to translate an axle for the purpose of gripping a fishing line.

There are several disadvantages with a conventional cover type fishing reel. For instance, the thumb motion necessary to actuate the operating member is not completely natural. Consequently, the fishing line cannot be smoothly and effectively gripped nor can the fishing rod be held properly.

SUMMARY OF THE INVENTION

An object of the present invention is to overcome the aforementioned disadvantage by providing an alternative thumb operating member which is actuated with a natural thumb motion. This permits the unwinding of the fishing line to be smoothly and easily regulated.

A cover type fishing reel according to the present invention comprises a reel casing, a cover disconnectably mounted on the reel casing, an elongated axle having opposite longitudinal first and second ends and supported by the reel casing for relative translational movement therebetween, an operating member contiguous with the first end of the axle for initiating the relative translational movement, and a rotor mounted at the second end of the axle in a pocket formed by the reel casing and the cover. The operating member is also supported on the reel casing for relative translational motion therebetween, however, the translational motion of the operating member is generally transverse to the translational movement of the axle. The operating member includes an operating face which engages a cam face on the axle such that the translational motion of the operating member causes the translational movement of the axle.

According to the present invention, the translational motion of the operating member corresponds to a natural thumb motion of a fisherman holding a fishing rod upon which the cover type fishing reel is mounted. The operating face of the operating member is therefore also translated by the natural thumb motion. Because of the interactive engagement of the operating face and the cam face, the translational motion of the operating face is transformed into the translational movement of the axle. The rotor is simultaneously translated with the axle so as to abut the cover wherein a fishing line is gripped between the rotor and the cover. The arrangement of the present invention allows the fisherman to smoothly and effectively regulate the grip on the fishing line with a reasonable and natural motion of the thumb on the hand which is holding the fishing rod.

Further, the arrangement of the present invention enables the fisherman to comfortable and properly hold the fishing rod while regulating the grip on the fishing line with a natural thumb motion.

BRIEF DESCRIPTION OF THE DRAWINGS

Other features and advantages of the present invention will be apparent from the following description in conjunction with the accompanying drawings wherein:

FIG. 3 is a side elevation view of a cover type fishing reel according to the present invention;

FIG. 4 is a sectional detail view of an operating member according to the present invention; and FIG. 5 is a sectional detail view of another operating member according to the present invention.

DESCRIPTION OF THE PREFERRED EMBODIMENTS

Figure 1:
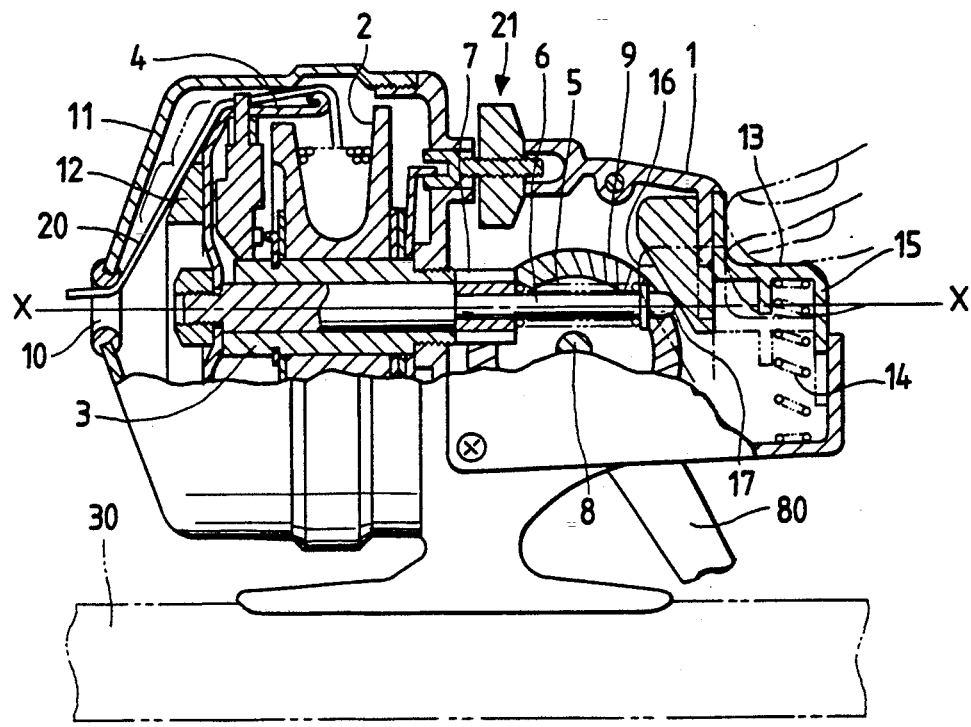
FIG. 1 is a partial sectional elevation view of a cover type fishing reel according to the present invention.
Figure 2:
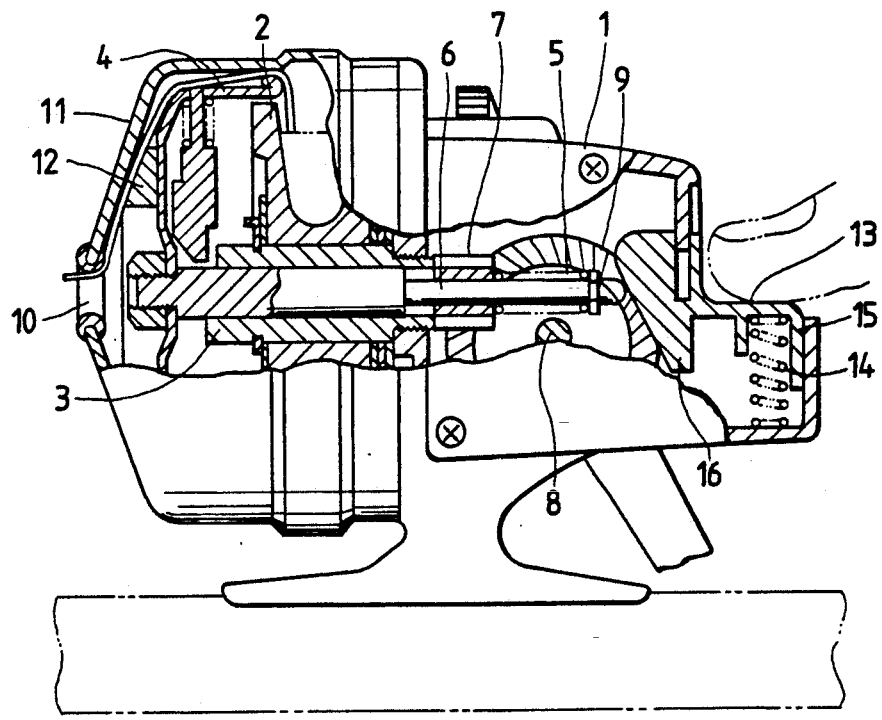
FIG. 2 is a partial sectional elevation view of a cover type fishing reel according to the present invention showing the fishing line gripped between the rotor and cover according to the present invention.

FIGS. 1-3 show a cover type fishing reel including a reel casing 1. A spool 2 is rotatably supported on an elongated tube 3 fixed to the reel casing 1. A drag mechanism 21 resists rotation of the spool 2 with respect to the reel casing 1 and elongated tube 3. An axle 6 is supported for rotation about an axis X—X by the elongated tube 3. Further, the axle 6 is translatable along the axis X—X with respect to the elongated tube 3. A rotor 4 is fixed to an end of the axle 6 for movement therewith.

The axle 6 is rotated by a pinion 7. The pinion 7 is translatable, but not rotatable with respect to the axle 6. A ring gear 9 is drivingly engaged with the pinion 7 and fixed to a handle shaft 8. The handle shaft 8 is fixed to a handle 80 such that rotation of the handle 80 causes rotation of the handle shaft 8 and the ring gear 9, which in turn causes rotation of the pinion 7 and the axle 6.

The axle 6 is translated by an operating member 15 supported by the reel casing for relative translational motion. A spring 5 biases the axle 6 and the rotor 4 toward a winding configuration as shown in FIG. 1. In the winding configuration, a fishing line pressing part 12 is spaced from a cover 11, thereby enabling a fishing line 20 to be freely movable therebetween. Depressing the operating member 15 causes the axle 6 and rotor 4 to be translated with respect to the reel casing 1, thereby gripping the fishing line 20 between the fishing line pressing part 12 ad the cover 11, as shown in FIG. 2.

The operating member 15 includes a thumb seat 13 which receives the fisherman's thumb as shown in FIGS. 1 and 2, and an operating face 16 which is contiguous with a cam face 17 of the axle 6. A return spring 14 biases the operating member 15 against the motion of the fisherman's thumb. The operating face 16 is oriented obliquely with respect to the translational motion of the operating member 15, consequently, the translational motion causes translational movement of the axle 6 in response to the wedge action of the operating face 16.

The operation of the present invention will now be described. The natural motion of a fisherman's thumb on the thumb seat 13 causes translational motion of the operating member 15 with respect to the reel casing I. Concurrently, the obliquely oriented operating face 16 causes translational movement of the axle 6 with respect to the reel casing 1 owing to the wedge action of the operating face 16. The translational movement of the axle 6 is generally transverse to the translational motion of the operating member 15. The translational movement of the axle 6 causes the fishing line pressing part 12 to abut the cover 11, gripping the fishing line 20 therebetween. When pressure on the operating member 15 by the fisherman's thumb is released, the operating member 15 and operating face 16 are oppositely translated by the bias of the return spring 14, the axle 6 is oppositely translated by the bias of the spring 5, and the grip on the fishing line 20 is released.

The operating face 16 may be integrally formed with the operating member 15, as shown in FIGS. 1 and 2, or it may be produced separately and subsequently fixed to the operating member 15.

Further, the return spring 14 may be eliminated and the spring 6 made strong enough to oppositely translate the axle 6 and the operating member 15.

FIG. 4 shows another embodiment of the present invention in which a cam face 17' is obliquely oriented with respect to the X—X. It is noted that the cam face 17' rotates with, and is fixed to the axle 6 in the embodiment shown in FIG. 4.

FIG. 5 shows yet another embodiment of the invention in which a cam face 17" is supported on the reel casing 1 for relative translation. Further, the cam face 17" is rotatably mounted on the axle 6 whereby translational movement of the cam facing 17" is conveyed to the axle 6, however, the rotation of the axle 6 is not conveyed to the cam facing 17".

In both of the embodiments shown in FIGS. 4 and 5, a return spring 14 may be incorporated to oppositely translate the operating member 15.

As mentioned before, the present invention enables a fisherman to smoothly and effectively regulate gripping a fishing line with a comfortable and natural thumb motion. At the same time, the present invention enables the fisherman to maintain a comfortable and proper hold on the fishing rod attached to the cover type reel while regulating the grip on the fishing line.

The present invention is not confined to the embodiments described above, but may be embodied or practiced in other various ways without departing from the scope and spirit of the appended claims.

What is claimed is:

1. A cover type fishing reel comprising:
   a reel casing;
   a spool rotatably supported in said reel casing about a first axis;
   a handle means for rotating said spool and supported by said reel casing for rotation about a second axis, said second axis being generally transverse to said first axis;
   an operating member supported by said reel casing for relative translational motion with respect to said reel casing in a first direction;
   an axle supported by said reel casing for relative translational movement with respect to said reel casing in a second direction, said translational movement of said axle in said second direction is generally transverse to said first direction of said translational motion of said operating member;
   an operating facing on said operating member, said operating facing is oriented obliquely with respect to said translational motion of said operating member; and
   a cam facing on said axle, said operating facing contiguously engaging said cam facing;
   wherein a wedge action between said operating facing and said cam facing is caused by said translational motion of said operating member, and said wedge action causes said translational movement of said axle.

2. The cover type fishing reel according to claim 1, wherein said axle passes through said spool and engages a rotor means for gripping a fishing line between said cover and said rotor means, wherein said translational movement of said axle translates said rotor between a fishing line gripping position and a fishing line released position.

3. The cover type fishing reel according to claim 1, further comprising:
   a spring biasing said axle toward said operating member.

4. The cover type fishing reel according to claim 3, further comprising:
   a return spring means for biasing said operating member away from said axle.

5. A cover type fishing reel comprising:
   a reel casing;
   a spool rotatably supported in said reel casing about a first axis;
   a handle means for rotating said spool and supported by said reel casing for rotation about a second axis, said second axis being generally transverse to said first axis;
   an operating member supported by said reel casing for relative translational motion with respect to said reel casing in a first direction;
   an axle supported by said reel casing for relative translational movement with respect to said reel casing in a second direction, said translational movement of said axle in said second direction is generally transverse to said first direction of said translational motion of said operating member;
   a cam facing on said axle, said cam facing is oriented obliquely with respect to an axis of translation of said axle; and
   an operating facing on said operating member, said operating facing contiguously engaging said cam facing;
   wherein said translational motion on said operating facing causes a wedge action on said obliquely oriented cam facing, and said wedge action causes said translational movement of said axle.

6. The cover type fishing reel according to claim 5, wherein said cam facing is fixed to said axle.

7. The cover type fishing reel according to claim 5, wherein said cam facing is rotatably mounted with respect to said axle.

* * * * *